(12) United States Patent
Pratt (10) Patent No.: US 7,842,399 B2
(45) Date of Patent: Nov. 30, 2010

(54) SLIDING BEARING ELEMENT AND METHOD OF PRODUCING

(75) Inventor: George Pratt, Isle of Harris (GB)

(73) Assignee: Federal-Mogul Wiesbaden GmbH & Co. KG, Wiesbaden (DE)

( * ) Notice: Subject to any disclaimer, the term of this patent is extended or adjusted under 35 U.S.C. 154(b) by 1118 days.

(21) Appl. No.: 10/588,831

(22) PCT Filed: Feb. 10, 2005

(86) PCT No.: PCT/EP2005/001464

§ 371 (c)(1),
(2), (4) Date: Aug. 9, 2006

(87) PCT Pub. No.: WO2005/078296

PCT Pub. Date: Aug. 25, 2005

(65) Prior Publication Data

US 2007/0134508 A1    Jun. 14, 2007

(30) Foreign Application Priority Data

Feb. 12, 2004    (EP) .................................. 04003113

(51) Int. Cl.
*B32B 3/02* (2006.01)
*F16C 17/00* (2006.01)
(52) U.S. Cl. ................... 428/614; 384/276; 428/621; 428/626; 428/642; 428/647; 428/648

(58) Field of Classification Search ................... None
See application file for complete search history.

(56) References Cited

U.S. PATENT DOCUMENTS 2,459,172 A * 1/1949 Luetkemeyer et al. ...... 428/643

(Continued)

FOREIGN PATENT DOCUMENTS

DE    3224751 A    2/1984

(Continued)

OTHER PUBLICATIONS

Merriman, MacDonald & Evans LTD, A Dictionary of Metallurgy (1958)—Definition of Phosphorus Bronze.*

(Continued)

*Primary Examiner*—Jennifer C McNeil
*Assistant Examiner*—Adam C Krupicka
(74) *Attorney, Agent, or Firm*—Robert L. Stearns; Dickinson Wright, PLLC (57) ABSTRACT

A sliding bearing element is characterized in that a bearing material that is bonded to the backing is disposed at least at the edges of the backing in form of wires in the circumferential direction and that a soft material is located at least in a space between said wires. At least one intermediate wire can be disposed between the two edge wires generally running in the circumferential direction. The method comprises the following processing steps: providing a strip of steel or any other material having the required degree of strength which forms the backing of the bearing to be produced, bonding at least one wire at each of the two edges of the backing strip, whereat disposing the wires in such a manner that said wires run in circumferential direction generally, and filling out the spaces between the wires with soft material.

25 Claims, 9 Drawing Sheets

U.S. PATENT DOCUMENTS 2,490,700 A * 12/1949 Nachtman .................... 205/170
4,474,861 A * 10/1984 Ecer ............................ 428/614
5,229,198 A *  7/1993 Schroeder ....................... 442/7
5,852,139 A * 12/1998 Scheckenbach ............. 525/537

FOREIGN PATENT DOCUMENTS

| EP | 0244396 A | 11/1987 |
| --- | --- | --- |
| GB | 524128 A | 7/1940 |
| JP | 08135660 A * | 5/1996 |

OTHER PUBLICATIONS

Merriman, MacDonald & Evans LTD, A Dictionary of Metallurgy (1958)—Definition of White Metal.*

* cited by examiner

SLIDING BEARING ELEMENT AND METHOD OF PRODUCING

BACKGROUND OF THE INVENTION

1. Technical Field

The invention relates to a sliding bearing element comprising a backing, especially made of steel, said backing is lined with a bearing material and a soft material, wherein the bearing material is capable of sustaining a bearing load and the soft material is of anti-seizure quality. Within the scope of the present invention the slide bearing can consist Of two half cylinders or the slide bearing is a bush. So that the sliding bearing element is either a half cylinder (half-cylinder type) or the element is a bush (bush-type).

2. Related Art

Such sliding bearing elements are used as oil lubricated crankshaft bearings in internal combustion engines. In this case each bearing comprises two half cylinders clamped together in the big end of the connecting rod—the rod bearing or big end bearing—or the cylinder block and a retaining cap—main bearing.

It has been found that the good load sustaining qualities of the bearing alloy and the excellent bearing qualities of the soft alloy impart the bearing the required properties for constituting a high quality bearing with less friction.

On the one hand the bearing has to be capable of sustaining the bearing load. This is achieved by the bearing alloy bonded to the backing, whereby a supporting framework is formed which includes recesses or depressions. The backing itself is of steel or any other material having the required degree of strength in order to serve as a sufficiently strong support for the bearing.

On the other hand the soft alloy is filled in the spaces between the framework of the bearing alloy constituted by the recesses or depressions. The soft alloy makes sure that the bearing is provided with a sliding surface having a low friction-coefficient.

So, the two essential properties—required degree of strength, low friction sliding surface, which are in general opposite requirements—are realized by a combination of two materials of different characteristics, whereby each material is responsible for one specific property of the bearing.

According to the mentioned state of the art the U.S. Pat. No. 2,971,248 discloses a bearing of the species in question and a method of forming such bearings.

The bearing has a backing strip formed of a material A, which is steel or any other material having the required degree of strength necessary to be used as a bearing support structure. One face of this strip is clad with a bearing material B applied thereto by a suitable method and having one of the essential characteristics i.e. that of high load sustaining power. Depressions C are formed in the material B, preferably grooves spaced from each other and running longitudinally of the strip and therefore axially of the bearing shell.

The grooves are then filled with a material D having a different characteristic from that of portion B i.e. an anti-seizure quality. So, material B has a low friction coefficient.

The opposite sides of these grooves are parallel to each other so that the groove is of the same width throughout its entire depth. In other words the walls of the groove are normal to its surface. Within this document the specific shape of the grooves is considered to be of high importance with respect to the method of producing. According to one method recommended by this patent the coating of the bearing consisting of the different materials B and D is concaved subsequent to the filling of the soft material in the grooves. The concaving procedure changes the diameter of the bearing and thereby may change the ratio of the surface area of material B to the surface area of the material D, when the recesses or depressions taper in an inward direction.

The sliding bearing element disclosed in the U.S. Pat. No. 2,971,248 are provided with a series of parallel longitudinal grooves, which are at least partially open at the front ends of the bearing. So, the outer surface of the bearing at its front sides is formed by the soft material at least in parts.

During engine operation the bearing load will result in an axial movement of the soft alloy B. The less resistant material B is squeezed by the load in axial direction and leaves the bearing at its front ends. Such movement leads to fatigue cracking or swaging of the lining and eventual bearing failure.

Another disadvantage of said bearing is that the recesses or depressions, preferably grooves, are generated by procedures like knurling or the like. This stamp step results in a hardening of the bearing material and thereby a reduction in the anyway worse anti-friction properties of the bearing alloy.

If the grooves are formed by broaching or the like, the producing process will be time-consuming and costly. Moreover it may be difficult to get a satisfactory connection between the bearing alloy and the soft alloy and so to form an integral, reliable sliding surface.

The U.S. Pat. No. 5,000,586 also discloses a multilayer plain bearing with a backing layer having an intermediate layer with grooves formed therein and filled with a bearing or sliding material, wherein a selective distribution of harder material and softer material on selected areas of the bearing is provided as a function of specific bearing operating requirements.

Following this document the recommended design enables basically an improved dimensioning of the sliding layer on the bearing portions more subjected to high loads and shaft misalignments. It should also offer a more uniform distribution of pressures of the bearing portions.

However, the grooves are arranged crosswise the bearing length and so are open at the front ends of the bearing at least at parts. The consequences are laid down above in detail.

A similar sliding bearing element is disclosed in the German laid open publication DE 36 21 577 A1 by the applicant himself. These bearings are characterized in that the groove-shaped recesses in the bearing coating are just disposed in a specific circumferential section, which is subjected to the highest loads during engine operation, whereat this section should be smaller than half of the bearing circumference. The creation of the grooves in this disclosure requires an additional machining operation and a subsequent difficult and expensive operation, if the grooves are to be filled with white metal.

SUMMARY OF THE INVENTION

Taking into account the above mentioned state of the art and the corresponding problems it is an objective of the invention to present a bearing of the species in question, whereat the soft alloy is prevented from leaving the bearing i.e. the sliding surface and coating respectively, in order to avoid a failure of the bearing by a fatigue cracking or the like. A second objective with respect to the sliding bearing element is to realize a surface-ratio—surface area of soft alloy to the surface area of bearing alloy—as high as possible i.e. to increase the soft alloy surface part in order to improve the anti-friction characteristics of the bearing.

Normally if the bearing alloy is copper based it is a copper-lead-tin alloy and the main constituent being copper, the lead content being generally 10-30%. The overlay of such bearings is formed generally by a thin layer of a lead based alloy which may be lead-tin, lead-tin-copper, lead-indium, lead-tin-indium or lead-tin-indium-copper. The main constituent of these overlays is lead. But because of environmental consideration current developments in bearing materials have the objective to replace lead by other materials which have bearing qualities as good as lead without the disadvantage of the toxicity.

In recent years a non-lead based overlay has been developed in the form of a sputtered aluminum-tin layer. However the copper-lead-tin alloy lining has been retained, and the bearing therefore is not lead-free at the present. Consequently it is an objective to provide a lead-free bearing or to reduce the lead content as far as possible.

Another objective of the present invention is to provide a method of producing a sliding bearing element, which fulfills the above mentioned requirements, and which is achieved by a process less expensive than those described in the aforementioned disclosures.

The problem known by the state of the art is solved by a sliding bearing element comprising a backing made of steel; said backing being lined with a bearing alloy and a soft material, wherein the bearing alloy is capable of sustaining a bearing load and the soft material is of anti-seizure quality and which is characterized in that:
 the bearing material bonded to the backing is disposed at least at the edges of the backing in the form of wires in the circumferential direction, and
 the soft material is located at least in a space between said wires.

The function of the wires is to prevent axial movement of the soft material which would otherwise take place under the high loads applied to the sliding surface through the oil film during engine operation. This effect is well known by using conventional bearings like those above mentioned within discussing the state of the art. The flowing of soft material in axial direction leads to fatigue cracking.

The inventive bearing is provided with at least two wires at the edges of the backing (i.e. front sides) in circumferential direction. These wires are composed of bearing alloy which has the required degree of strength and so said wires are able to serve as barrier for the soft material. Together with the backing the wires form a framework structure.

The movement in the circumferential direction is prevented by material lying outside the area of highest load which generally occurs at the bearing crown.

A preferred embodiment of the bearing is characterized in that the soft material covers the wires at the top in order to form a sliding surface by itself. The benefit of this bearing construction is, that the sliding surface is composed completely of the soft material and so has a very low friction-coefficient i.e. good bearing qualities.

Favorable bearings are sliding bearing elements with a coating above the wires having a thickness<30 µm, preferably a thickness<5 µm. The thickness between the coated wires and the surface is meant. If the thickness is within the claimed range the bearing can capitalize on the anti-seizure quality of the soft material, but an axial movement of the soft material can also be avoided, because the coating is not thick enough beginning to flow under load.

In some cases, in particular for diesel engines or high-load turbocharged engines, preferred embodiments are characterized in that the sliding surface is formed both by the wires and the soft material. Internal combustion engine bearings are subjected to mechanical loads generated by the pressure of combustion gases on the piston top, which are transmitted to the bearings by means of the connecting rods. The pressure in the combustion chamber of turbocharged engines or the like during engine operation is very high and leads to high bearing loads. In these cases it's necessary that parts of the sliding surface are formed by the bearing material having the required degree of strength for supporting the crankshaft.

It could be useful to bond one or more intermediate wires to the backing between the two edge wires generally running in the circumferential direction. This measure increases the resistance or stability of the sliding surface and the bearing as a whole.

Preferred embodiments of the sliding bearing elements are characterized in that the intermediate wires which generally run in the circumferential direction in addition oscillate in the axial direction of the sliding bearing element. It is preferred that the intermediate wires oscillate regularly. Preferably the intermediate wires take the form of a wave. The intermediate wire can be arranged in different ways. The intermediate wires can contact the edge wires, for example by its apexes if the intermediate wires are arranged like waves. It is also possible to have a space between the intermediate wires and the edge wires.

If two or more intermediate wires are used, they can contact one another or not which can depend f.e. on the wire pattern.

The advantages of the latter embodiments are based on the following knowledge. Although the sliding surface and the crankshaft are in theory separated by an oil film contact can occur between the crankshaft and the sliding surface. One reason for contact could be for instance a misalignment between the crankshaft and the bearing. Another reason could be the low oil pressure. Contact can also be realized if the engine operates in a high-load operating point.

Knowing that a contact between the crankshaft and the bearing is possible, it offers advantages, if said intermediate wires take the form of a wave or more general, if said intermediate wires have not the same axial position at each point of the bearing circumference. This construction prevents that always the same portions of the crankshaft have contact with the sliding surface. Furthermore, the construction has a positive effect with respect to seizure resistance. Because the axial position of the intermediate wires differs, the contact point moves on the crankshaft in axial direction.

If the main concern is that the bearing has good bearing qualities embodiments of the inventive sliding bearing element are preferred, wherein the edge wires and/or the intermediate wires have a circular cross-section. Within the scope of the present invention the term "circular cross-section" also covers oval cross-sections or rounded cross-sections in general. In the worst case this leads to a line-contact between the crankshaft and the bearing. In more detail the crankshaft will contact the wires at one point at its circular circumference.

Preferred embodiments of the sliding bearing element are characterized in that the edge wires and the intermediate wires have the same diameter. If a contact between the crankshaft and the bearing is occurred because of an absent oil film or high load operation, the edge wires and the intermediate wires can support the crankshaft assumed that the wires are part of the sliding surface.

Preferred embodiments of the sliding bearing element are characterized in that the edge wires and the intermediate wires have a diameter between 100 and 500 µm, preferably a diameter between 200 and 400 µm, in particular a diameter between 250 and 350 µm.

Sliding bearing elements of which the bearing alloy, i.e. the wire material, is a copper alloy, preferably copper-tin or copper-tin-phosphorus, have advantages.

Because of the inventive construction of the bearing in question it is possible to avoid the use of lead. Caused by the fact that the bearing alloy forms just in parts the sliding surface it is not required that the bearing alloy is of high anti-seizure quality. Copper based layers—copper-tin or copper-tin-phosphorus—have a sufficient load carrying capacity and together with tin or tin plus phosphorus a sufficient bearing quality, whereat the tin content of the copper alloy is preferably less than 12% and more than 4% by weight and the phosphorus content of the copper alloy is preferably less than 1.0% by weight, preferably between 0.01% and 1% by weight.

Favorable are sliding bearing elements of which the backing is coated, preferably with copper or nickel. It is easier to bond the wires to a such prepared backing taking into account that this will carried out in a thermal procedure.

Preferred embodiments of the sliding bearing element are characterized in that the soft material is a metal or a metal alloy and additionally that the soft material is tin-based or bismuth-based, whereat the tin-content and the bismuth-content of the soft material is more than 50% (percentage by weight), respectively. It has been found out that bismuth has good bearing qualities and can be used as a lead substitute. The tin-based soft material could be in the form of a tin-antimony-copper alloy (white metal or babbitt).

Embodiments of the sliding bearing element wherein the soft material is a polymer based composition have the additional advantage of being of lower weight. This will be useful, if the sliding bearing element belongs to the accelerated components in the combustion engine.

"Based" means at least 50 percentage by volume of the respective constituent. Consequently "polymer based composition" means at least 50 percentage by volume of polymer. It is preferred that the polymer based composition is based on polyphenylene sulphide, polyphenylene sulphone, polyetherether ketone, polyamide imide or aromatic polyester. In the following there are given some examples, but the invention is not restricted to these compositions.

Furthermore it is preferred that the polymer based composition incorporates at least one organic solid lubricant or inorganic solid lubricant. The lubricant improves the bearing qualities of the polymer based composition and in this way of the entire bearing.

Preferably, the amount of polymers forming the thermoplastic matrix is 50 to 95% by vol., the amount of solid lubricant is 5 to 40% by vol. and optimally wear reducing additives can be added in the amount of up to 25% by volume.

As solid lubricants graphite, molybdenum graphite, tungsten, disulfide, hexagonal boron nitride and/or zinc sulfide can be used.

Preferred wear reducing additives are poly(paraphenylene-terephathalamide) as powder or short fibers, iron (III)-oxide, alumina and/or titanium oxide.

A preferred polymer composition may be of 80% by volume polyphenylene sulphide and 20% by volume polytetrafluoroethylene or of 70% by volume polyphenylene sulphide, 20% by volume polytetrafluoroethylene and 10% by volume polyphenylene sulphone.

Furthermore the polymer based composition may be of 70% by volume polyetherether ketone, 20% by volume of poly-p-phenylene terephtalic amide (short fiber) and 10% by volume graphite.

A fourth composition is given by 70% by volume polyamide imide, 20% by volume polytetrafluoro ethylene, 5% by volume $MoS_2$ and 5% by volume BN. A polymer based composition of 80% by volume aromatic polyester, 15% by volume polytetrafluoro ethylene and 5% by volume $Fe_2O_3$ could be preferred.

In the case that the spaces between the wires are filled with a non-thermally conductory material such as a polymer, the wires have a secondary function of removing frictional heat generated in the surface or the bearing. From this point of view, the more wires the better.

If the soft material is polymer based, the area covered by wires is preferably at least 30% of the total area covered by soft material and wires.

A preferred use of the sliding bearing element is the use as bushings. Furthermore it is preferred to use the sliding bearing elements as crankshaft bearings.

A method for producing a sliding bearing element, in particular for producing a sliding bearing element of the above mentioned species, is also provided within the present invention and comprises the following processing steps:

providing a strip of steel or any other material having the required degree of strength which forms the backing of the bearing to be produced, bonding at least one wire at each of the two edges of the backing strip, whereat disposing the wires in such a manner that said wires run in circumferential direction generally, filling out the spaces between the wires with soft material.

A preferred method for producing a sliding bearing element is characterized in that the wires being bonded by a sintering process, preferably by induction sintering.

Advantages offered by a method, wherein the wires being sintered by a sintering process comprising the following processing steps:

continuously feeding the strip through an induction heating coil in which the steel is heated in a non oxidizing atmosphere to a temperature at which sintering takes place and dispensing the wires onto the strip surface within the induction heating coil such that the wires contact the strip surface as it reaches sintering temperature.

For producing a bearing with at least one intermediate wire a method is recommended, whereat the at least one intermediate wire being dispensed from dispensers reciprocating at right angles to the strip.

If the soft material is a metal or metal alloy a method is preferred, which is characterized in that, the filling out of the spaces between the wires is carried out by casting or by rolling at elevated temperature.

If the soft material is a polymer based composition a method is preferred, of whom the filling procedure is characterized in that, the filling out of the spaces between the wires with the soft material is carried out by producing the polymer based composition in tape form by extrusion and rolling the tape at a temperature corresponding to its softening point in the spaces.

Alternatively a method with the following filling process can be used, in which the filling out of the spaces between the wires with the soft material is carried out by producing the polymer composition in paste form by means of an organic solvent and rolling the paste into the spaces and subsequently heat treating to remove the solvent and consolidate the polymer composition.

A third alternative for a filling out of the spaces with a polymer based composition is characterized in that:

the filling out of the spaces between the wires with the soft material is carried out by producing the polymer composition as a powder or a blend of powders, and spreading the powder or powder blend onto the strip in such a way as to fill the spaces between the wires, and consolidating the powder or powder blend by heat treating or heating and rolling.

Owing to the low thermal conductivity of polymer based compositions it is preferred that a plurality of wires is sintered to the steel backing in order that the frictional heat generated in the oil film between the crankshaft and the bearing may be more effectively removed through the bearing.

THE DRAWINGS

In the following the invention is illustrated in more detail by the FIGS. 1 to 8 and is described in more detail by the corresponding specification. In this connection it shows FIG. 1 a first embodiment of the sliding bearing element as an intermediate product in the perspective cross section view, FIG. 2a,b a second and a third embodiment of the sliding bearing element as an intermediate product in the perspective cross section view, FIG. 3a the intermediate product shown in FIG. 2a in the top view, FIG. 3b,c the intermediate product of a fourth embodiment in the top view, FIG. 4 the second embodiment of the sliding bearing element as finished product (half-cylinder-type) in perspective illustration, FIG. 5 a fourth embodiment of the sliding bearing element as finished product (bush-type) in perspective illustration, FIG. 5a a fifth embodiment of the sliding bearing element as finished product (bush-type) in perspective illustration, FIG. 6 a sixth embodiment of the sliding bearing element as intermediate product in the cross section view and, FIG. 7 the process step of bonding the wires to the backing strip within a first embodiment of the inventive method of producing.

DETAILED DESCRIPTION

Figure 1:
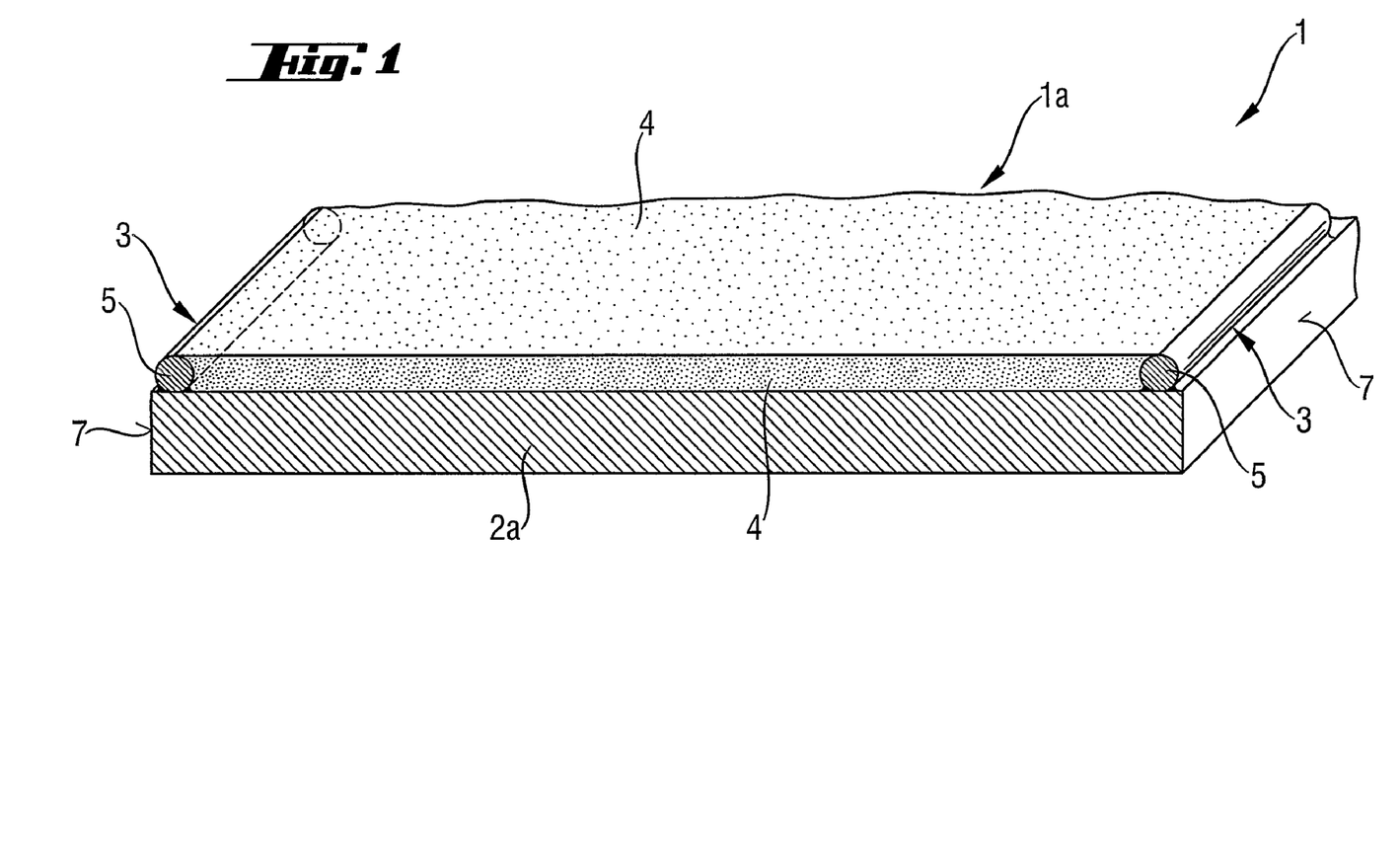

FIG. 1 shows an intermediate product 1a of a sliding bearing element 1. This half-finished product 1a comprises a backing strip 2a formed of steel or any other material having the required degree of strength. Said backing strip 2a is lined with a bearing alloy 3 and a soft material 4, wherein the bearing alloy 3 is capable of sustaining a bearing load and the soft material 4 is of anti-seizure quality.

The bearing alloy 3 bonded to the backing strip 2a is disposed at the edges of the backing strip 2a in form of wires 5 in circumferential or lengthwise direction, and the soft material 4 is located in the space between said edge-wires 5.

The wires 5 are bonded to the steel backing by raising the temperature of the steel strip as it passes through the induction heating coil to a temperature approaching the melting point of the wire (ca. 800° C. in the case of bronze wire). The wire 5 is heated by radiation from the hot steel, softens and comes into contact with the steel. Sintering of the wire to the steel takes place and a firm bond is established.

Figure 2A:
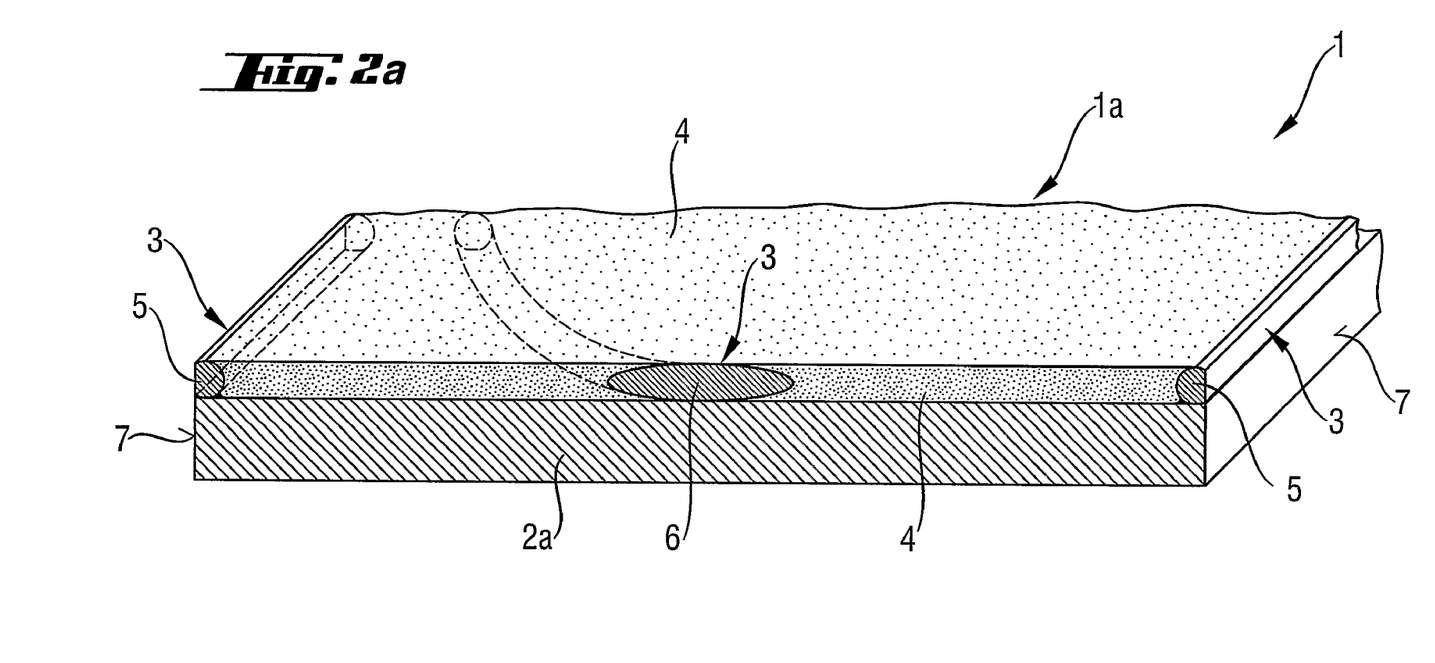

FIG. 2a shows a second embodiment of the inventive bearing as an intermediate product 1a in the perspective cross section view. In addition to the first embodiment shown in FIG. 1 the second embodiment is provided with one intermediate wire 6.

Figure 3A:
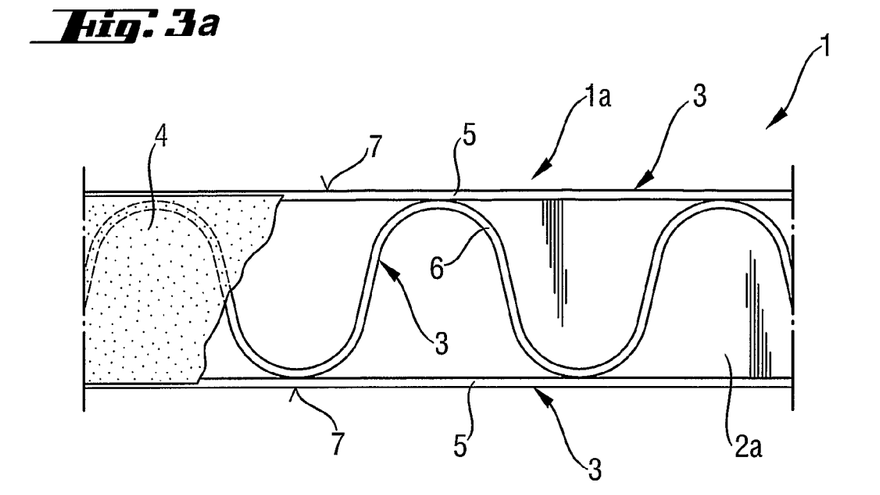

The intermediate wire 6, which runs generally in the circumferential direction like the edge wires 5, oscillates regularly in the axial direction, i.e. from the left to the right side and backwards forming a regular wave (FIG. 3a).

Figure 2B:
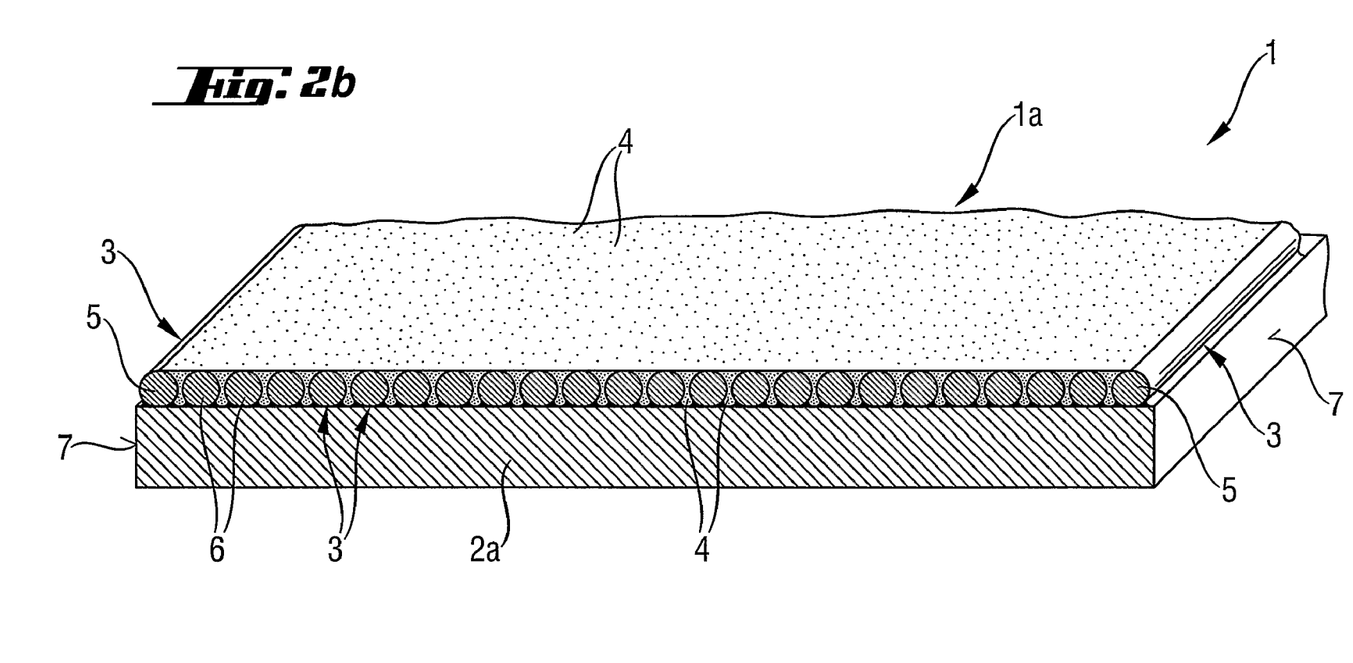

In contrary to the embodiment shown in FIG. 2a the front ends 7 of backing strip 2a and wires 5 shown in FIGS. 1 and 2b are not machined after coating with bearing alloy 3 and soft material 4. Consequently the front ends 7 have not a plane surface, preferably a rectangular shape, but a curved surface.

FIG. 2b shows a third embodiment in the perspective cross section view. The area between the edge wires 3, 5 is completely filled with intermediate wires 6. All wires 5 and 6 are parallel to one another and the spaces between the wires are filled with soft material.

FIG. 3a shows a top view of a material strip according to the second embodiment of FIG. 2a comprising one intermediate wire 6 forming a regular wave that can contact the edge wires 5. The soft material 4 is partly shown for more clarity.

Figure 3B:
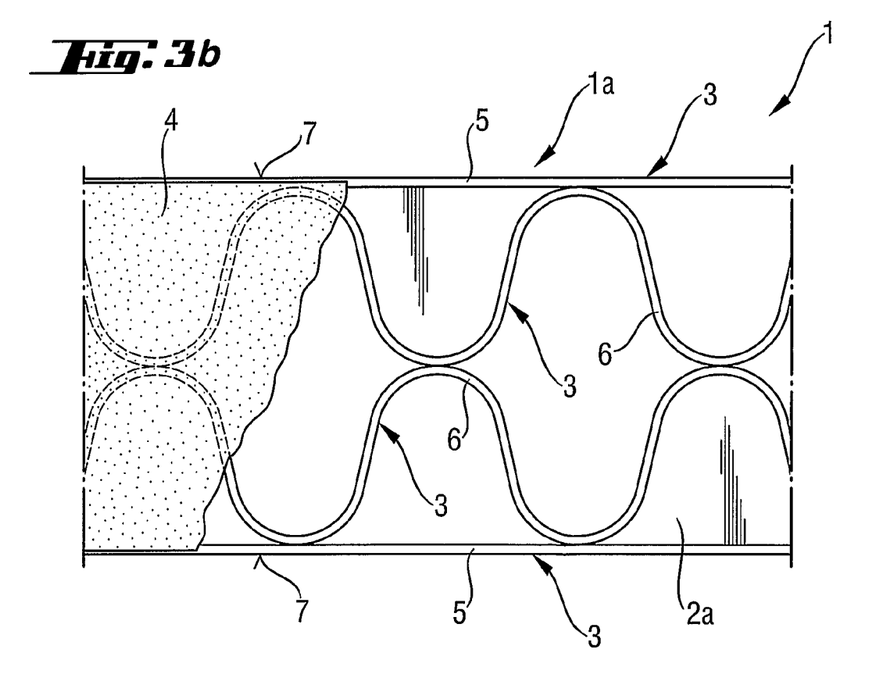
Figure 3C:
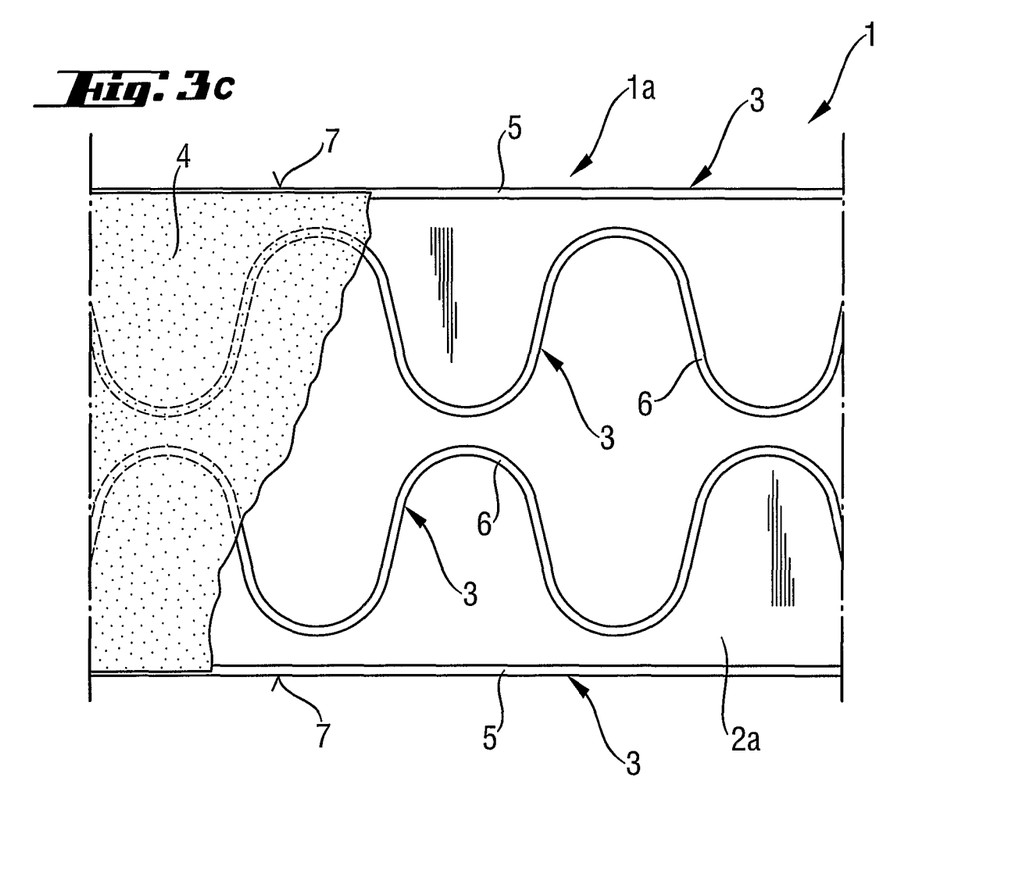

In FIG. 3b an alternative fourth embodiment is shown where two intermediate wires 6 are arranged between the edge wires 5. The intermediate wires 6 contact one another in their apexes and their apexes also contact the edge wires 5. Another wire pattern is possible, where for examples the apexes don't contact one another (FIG. 3c). The soft material 4 is partly shown for more clarity.

Figure 4:
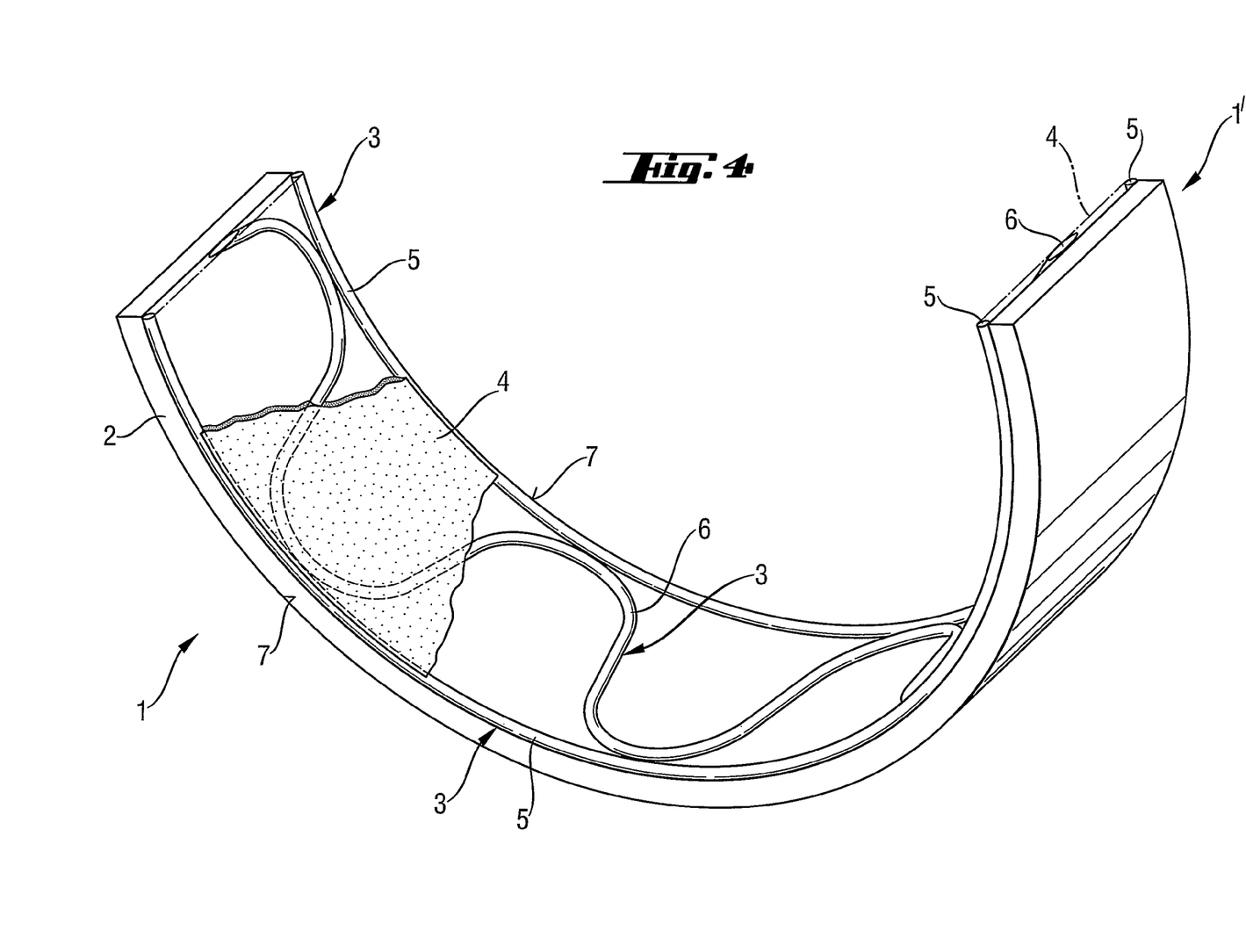

FIG. 4 shows the second embodiment of the inventive sliding bearing element as finished product in perspective illustration, whereby the element 1 is of the half-cylinder type 1'. The backing 2 coated with bearing alloy 3 in form of wires 5, 6 and soft material 4 is bent to a half-cylinder-shaped bearing 1. The wires being flush with opposite side edges of the backing and flush with the backing along their entire length so that there is no radial gap between the wires and the backing.

Figure 5:
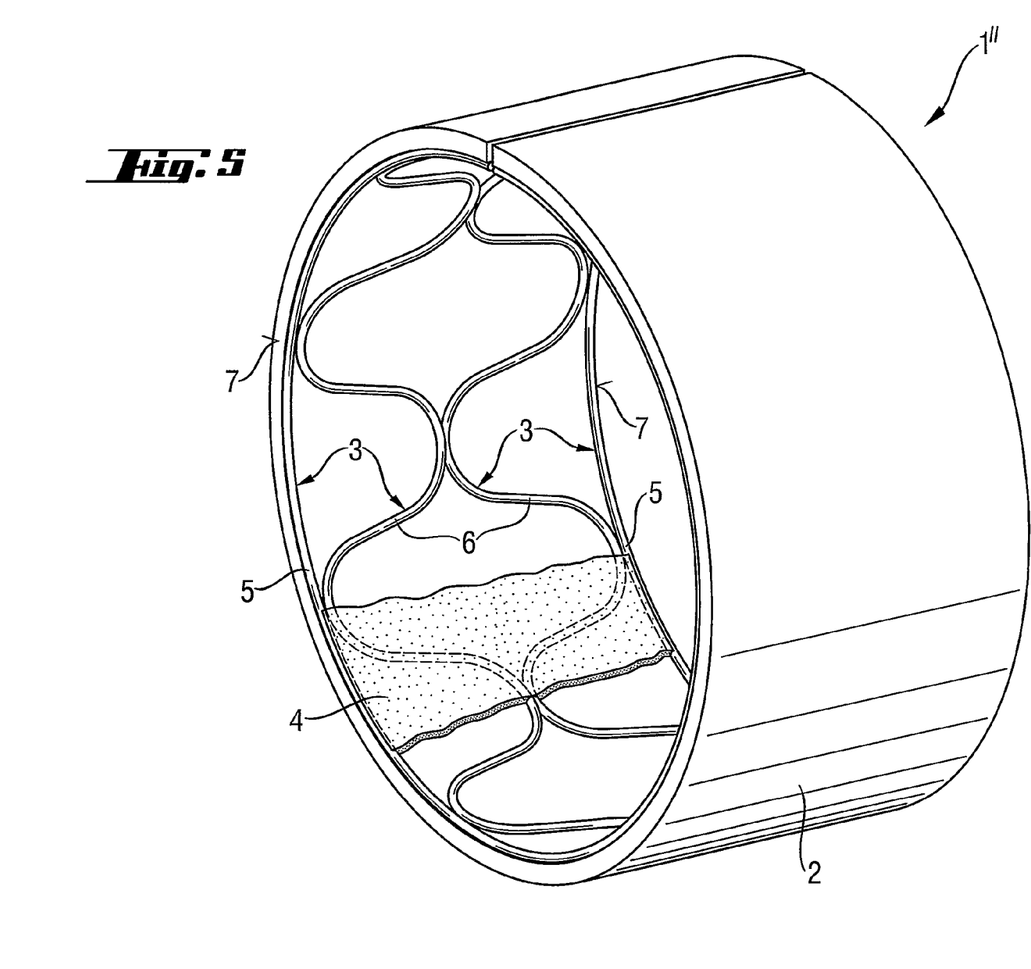

FIG. 5 illustrates a fourth embodiment of the sliding bearing element as a bushing 1" in perspective illustration. The structure is similar to that of the element shown in FIG. 3b. That means the sliding bearing element 1 has a backing 2, on which two edge wires 5 and two intermediate wires 6 be composed of bearing alloy 3 are bonded. In the spaces between the wires 5, 6 a soft material 4 (partly shown) is located. This soft material 4 together with the wires 5, 6 forms the sliding surface of the sliding bearing element 1".

Figure 5A:
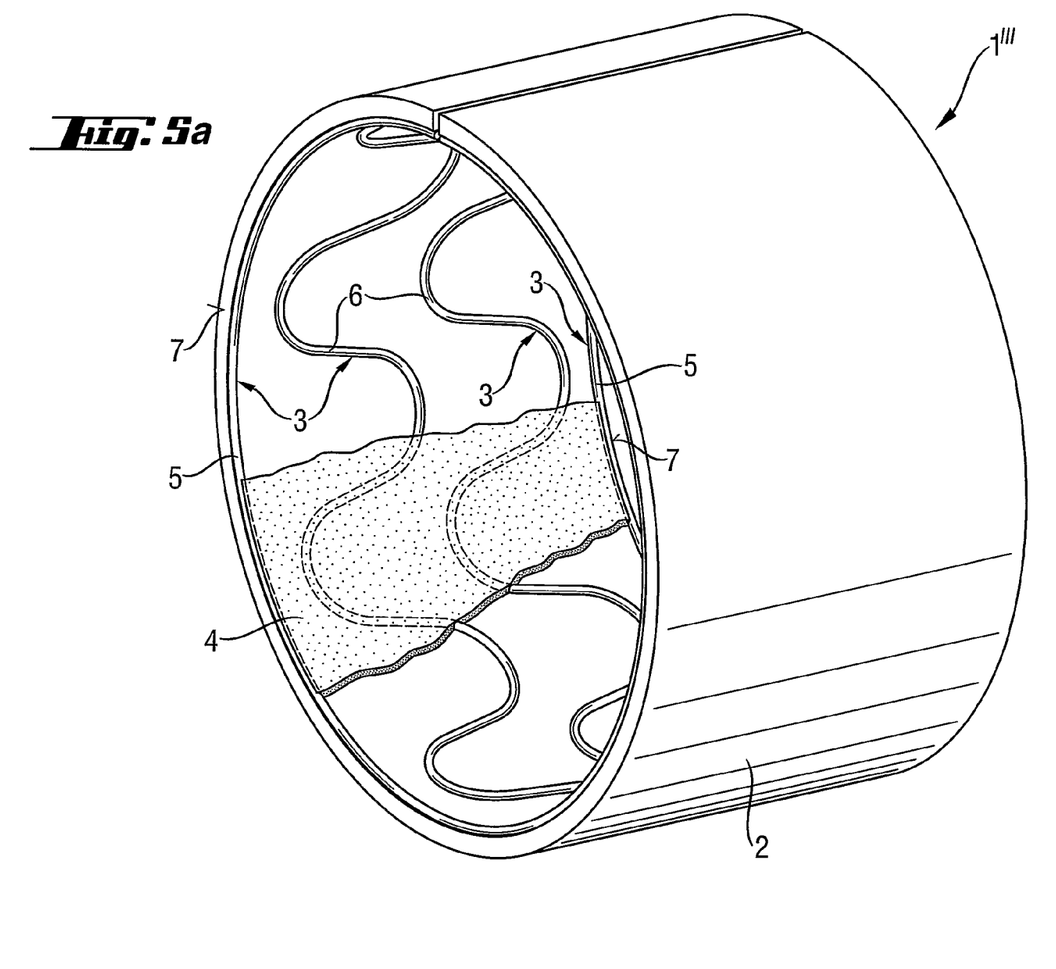

FIG. 5a illustrates a fifth embodiment of the sliding bearing element as a bushing 1'" in perspective illustration. The apexes of the intermediate wire waves 6 do not contact the edge wires 5. The waves of the intermediate wires 6 are synchronous. The soft material 4 is partly shown.

Figure 6:
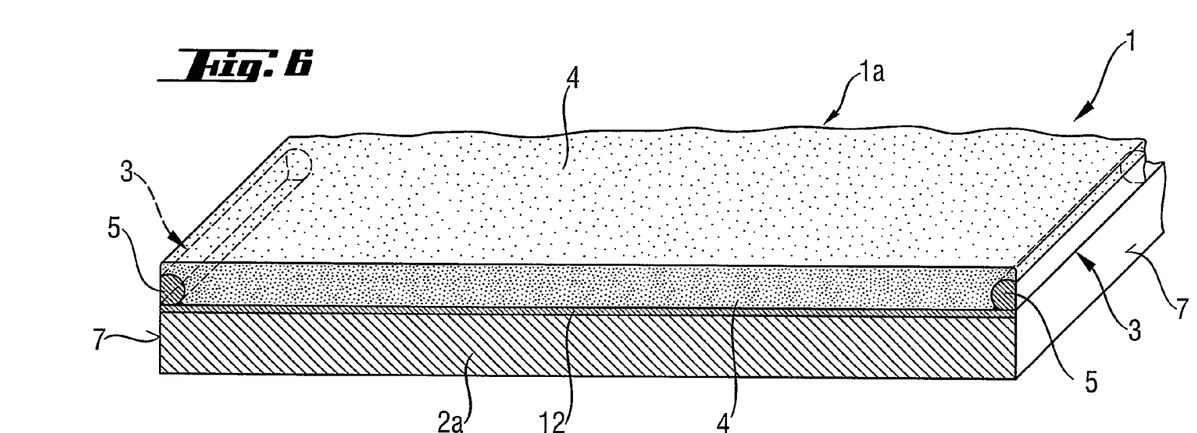

FIG. 6 shows a sixth embodiment of the sliding bearing element 1 as intermediate product 1a in the cross section view. This embodiment is characterized by an intermediate layer 12, which is preferably of copper or nickel. This layer 12 is electroplated onto the backing strip 2a in a first producing step before the backing strip 2a is lined with a bearing alloy 3 and a soft alloy 4. The additional layer 12 facilitates the sintering process. The backing strip 2a is machined at the front ends 7 after coating with bearing alloy 3 and soft material 4. Another difference to the embodiments described hereinbefore is that the sliding surface is constituted only by the soft material 4 which covers the wires 5. The wires 5, 6 composed of the bearing alloy 3 are not part of the sliding surface. But if the sliding surface is partly worn out during engine operation, the wires 5, 6 may become part of the surface.

Figure 7:
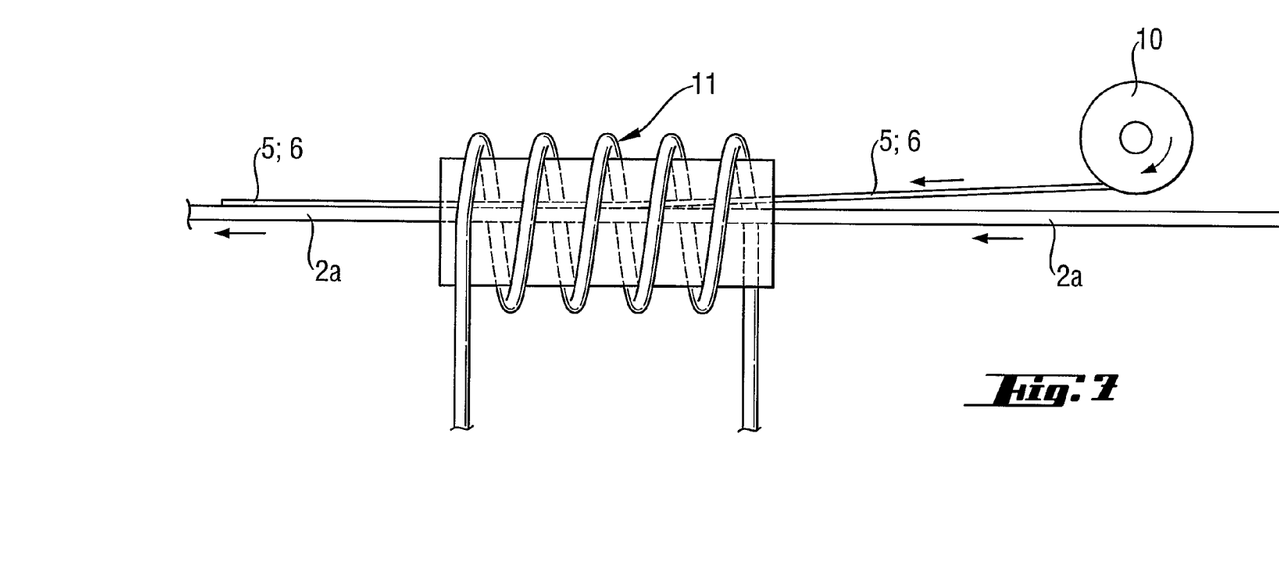

FIG. 7 shows the process step of bonding the wires 5, 6 to the backing strip 2a within a first embodiment of the inventive method of producing a sliding bearing element.

The wire 5, 6 is wound on a spool 10, which serves as a dispenser, and enters together with a backing strip 2a of steel an induction heating coil 11 in axial direction from one side.

The strip 2a is continuously feeding through an induction coil 11 in which the steel is heated in a non oxidizing atmosphere to a temperature at which sintering takes place. The spool 10 is provided with a light brake for back tension of the wire.

The wire 5, 6 contacts onto the strip 2a surface within the induction coil 11 once it approaches sintering temperature. The backing strip 2a with the bonded wire 5, 6 leave the induction heating coil 11 at the opposite end of the coil 11.

If desired all wires 5, 6—the edge wires 5 and the intermediate wires 6—sintered to the backing strip 2a in one step or several steps. If the intermediate wire 6 forms a wave (i.e. the wire oscillates in axial direction), the spool 10, which serves as an dispenser, reciprocates at right angles to the strip 2a in corresponding manner.

What is claimed is:

1. Sliding bearing element comprising a curved backing made of steel extending lengthwise in a circumferential direction and laterally between opposite side edges of said backing, said backing being lined with a bearing material and a soft material, wherein said bearing material is capable of sustaining a bearing load and said soft material has anti-seizure properties, said bearing material including at least two individual strands of wire bonded to said backing and flush with said opposite side edges, respectively, of said backing, said at least two strands of wire lying flush against and in contact with said backing along their entire lengths such that there is no radial gap between said backing and said at least two strands of wire, and where the soft material is located at least in a space between at least two strands of said wires and wherein said at least two strands of wire present a containment barrier to inhibit lateral displacement of said soft material under compression load in use beyond said opposite edges of said backing.

2. Sliding bearing element according to claim 1 wherein the soft material covers the wires in order to form a sliding surface by itself.

3. Sliding bearing element according to claim 2, wherein the soft material extends above the wires by a thickness of <30 μm.

4. Sliding bearing element according to claim 3, wherein the thickness of the soft material extending above the wires is <5 μm.

5. Sliding bearing element according to claim 1, wherein a sliding surface of the bearing element is formed by the wires and the soft material.

6. Sliding bearing element according to claim 1, wherein at least one intermediate wire is bonded to the backing between the two edge wires generally running in a circumferential direction.

7. Sliding bearing element according to claim 6, wherein the intermediate wire generally runs in the circumferential direction and in addition oscillates in the lateral direction of the sliding bearing element.

8. Sliding bearing element according to claim 7, wherein the oscillation of the intermediate wire is regular.

9. Sliding bearing element according to claim 8, wherein the oscillating intermediate wire has the shape of a wave.

10. Sliding bearing element according to claim 1, wherein the edge wires and/or the intermediate wire have a circular cross-section.

11. Sliding bearing element according to claim 1, wherein the edge wires and the intermediate wire have the same diameter.

12. Sliding bearing element according to claim 1, wherein the edge wires and the intermediate wire have a diameter of between 100 and 500 μm.

13. Sliding bearing element according to claim 1, wherein the edge wires and the intermediate wire have a diameter of between 200 and 400 μm.

14. Sliding bearing element according to claim 1, wherein the edge wires and the intermediate wire have a diameter of between 250 and 350 μm.

15. Sliding bearing element according to claim 1, wherein the bearing alloy is a copper alloy.

16. Sliding bearing element according to claim 15, wherein the copper alloy is a copper-tin alloy in which the tin content of the copper alloy is less that 12% by weight and more than 4% by weight.

17. Sliding bearing element according to claim 16, wherein the copper alloy comprises a copper-tin-phosphorus alloy in which the phosphorus content of the copper ally is less than 1.0% by weight and greater than 0.01% by weight.

18. Sliding bearing element according to claim 1, wherein the backing is coated with either copper or nickel.

19. Sliding bearing element according to claim 1, wherein the soft material is either a metal or a metal alloy.

20. Sliding bearing element according to claim 19, wherein the soft material is tin-based.

21. Sliding bearing element according to claim 19, wherein the soft material is bismuth-based.

22. Sliding bearing element according to claim 1, wherein the soft material is a polymer based composition.

23. Sliding bearing element according to claim 22 wherein the polymer based composition is based on polyphenylene sulphide, polyphenylene sulphone, polyetherether ketone, polyamide imide or polyaromatic polyester.

24. Sliding bearing element according to claim 22, wherein the polymer based composition incorporates an organic solid lubricant.

25. Sliding bearing element according to claim 22, wherein the polymer based composition incorporates an inorganic solid lubricant.

* * * * *